United States Patent

[11] 3,575,477

| [72] | Inventor | Edward M. Newsome |
| | | 25700 D'Hondt Court, Anchorville, Mich. 48043 |
| [21] | Appl. No. | 868,714 |
| [22] | Filed | Oct. 23, 1969 |
| [45] | Patented | Apr. 20, 1971 |

[54] SEAL
2 Claims, 1 Drawing Fig.

| [52] | U.S. Cl. | 308/36.3, 308/36.4, 277/13 |
| [51] | Int. Cl. | F16j 15/40 |
| [50] | Field of Search | 308/36.1, 36.3, 36.4; 277/13, 25 |

[56] References Cited
UNITED STATES PATENTS

| 813,723 | 2/1906 | Longwell et al. | 277/13 |
| 2,409,874 | 10/1946 | Lessmann | 308/36.4 |
| 3,470,655 | 10/1969 | Swigert | 308/36.3X |

*Primary Examiner*—Frederick L. Matteson
*Assistant Examiner*—Barry L. Grossman
*Attorney*—Cullen, Sloman and Cantor ABSTRACT: A large slinger disc is provided on a rotating shaft between a bearing and the point where the shaft emerges from the housing. A pressurized mist of oil is supplied to a chamber around the disc, and this oil flow is divided by the disc, the inner branch maintaining a wiper seal moist, and the outer branch continuously flowing out of the housing through a clearance gap surrounding the shaft.

PATENTED APR 20 1971
3,575,477
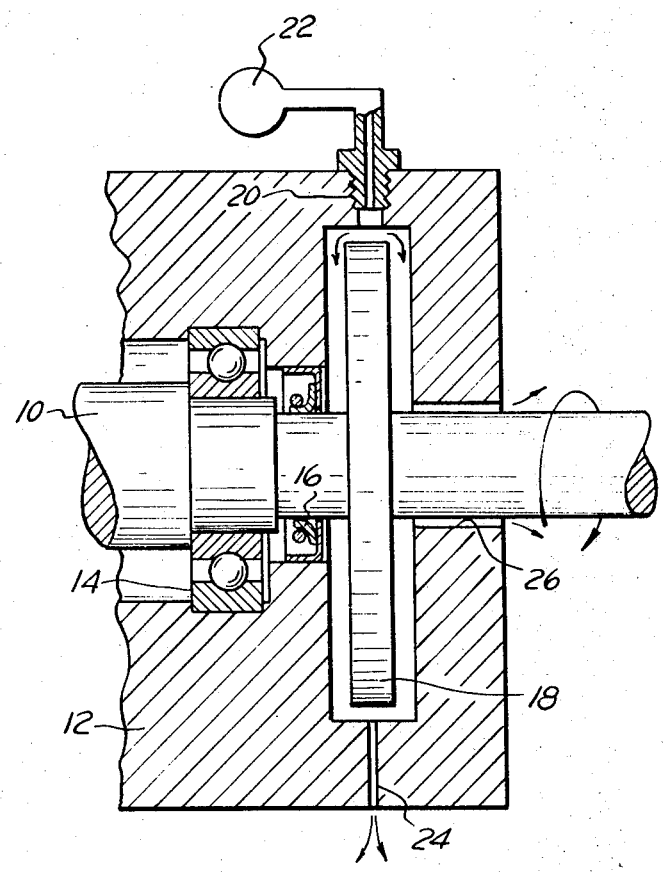
INVENTOR
EDWARD M. MEWSOME
BY Mullen, Sloman & Canto
ATTORNEYS

SEAL

BACKGROUND OF THE INVENTION

In grinding machines and the like, grinding dust and lapping compound and other debris eventually work past conventional protective seals and destroy bearings. This results in costly repair, replacement of parts, and unproductive down time of the machine.

It is the primary object of this invention to provide an improved means for sealing and protecting bearings from such debris.

BRIEF DESCRIPTION OF THE DRAWING

The FIGURE is an elevation in cross section of a housing containing a bearing and the novel seal of this invention.

DETAILED DESCRIPTION OF THE INVENTION

Referring to the FIGURE, there is illustrated a rotatable shaft 10 mounted within housing 12 by means of bearing 14. Bearing 14 may be a roller bearing or a ball bearing, for example. Next to the bearing is a conventional wiper type of oil seal 16 designed to prevent flow of fluid or debris from right to left as viewed in the FIGURE.

Shaft 10 is provided with a large flange or slinger disc 18 at a point between seal 16 and the outside or right-hand wall of housing 12. Disc 18 may be integral with or secured to the shaft, so that it rotates with it.

Housing 12 has an oil inlet port 20 immediately above disc 18, the port being supplied with a pressurized mist of oil from pump 22 at a pressure of about 10 p.s.i. Directly below disc 18 in housing 12 is a small outlet port preferably of a diameter about one thirty-second of an inch.

At the point which shaft 10 exits from housing 12 there is a clearance gap 26 of approximately .0025 inches on each side of the shaft.

OPERATION

A pressurized mist of oil is supplied from source 22 to inlet port 20 in housing 12. The mist divides as it enters the chamber surrounding slinger disc 18 and passes downwardly along the left and right sides of disc 18. That portion travelling down the left side of the disc keeps the wiper of seal 16 moist. This assures that the seal will not lose its effectiveness, since a dried out seal not only leaks but is eventually destroyed by friction.

That portion of the mist travelling down the right side of disc 18 flows outwardly through the small gap 26 between shaft 10 and housing 12. This continuous outward flow of oil through gap 26 from the pressurized chamber substantially reduces the quantity of debris which enters housing 12 along shaft 10. If any debris does get in, disc 18 acts as a barrier to further axial flow toward bearing 14. Furthermore, the slinging function of the disc keeps the debris flung radially outwardly by centrifugal force, thus keeping it away from seal 16. Without this slinging action, the debris would be picked up like a water wheel and dumped on top of the shaft, and eventually work its way through seal 16, destroying both the seal and the bearing. Disc 18 also assures that all of the supplied oil mist does not take the path of least resistance through gap 26 and out of the chamber, but rather at least a portion of it maintains seal 16 moist.

The one thirty-second of an inch diameter of outlet 24 in the bottom of housing 12 approximately equals the droplet size of 010 oil. A condensed droplet will block outlet 24 when shaft 10 is not rotating and the oil mist supply is shutoff, thus preventing any debris from entering port 24. When the machine is operating, excess oil will flow out under pressure, thus providing another exit for fine debris which has entered the housing.

This invention may be further developed within the scope of the following claims. Accordingly, the above specification is to be interpreted as illustrative of only a single operative embodiment of this invention, rather than in a strictly limited sense.

I claim:

1. In a machine wherein a horizontal shaft is rotatably mounted in a bearing retained in the machine housing, the improved system for sealing the bearing from debris which enters the housing along and around the shaft, which comprises:

a disclike radial flange on the shaft and rotatable therewith, said disc being located along the shaft between the bearing and the point at which the shaft emerges from the housing, the diameter of said flange being substantially larger than that of the adjacent portions of the shaft:

the machine housing closely following the contours of said flange, so as to create a chamber within which said flange rotates, and the housing opening through which the shaft emerges providing only a small annular clearance gap around the shaft on the order of .002—.005 inches;

a lubricant inlet port in the housing directly above said disc, and a tiny drain port in the housing directly below said disc, said drain port being about one thirty-second of an inch in diameter;

and a source of pressurized lubricant connected to said inlet port.

2. The sealing system of claim 1 which further includes an annular seal on said shaft between said flange and the bearing, said flange functioning to divide the incoming flow of lubricant so that a portion is directed at said seal to maintain it moist, and the remainder being directed toward said clearance gap, the continuous flow outward through said gap functioning to reduce the quantity of debris entering therethrough.